June 30, 1925.

H. R. TROTTER

BLEEDER TURBINE

Filed Aug. 13, 1923

1,544,285

WITNESSES

H. R. Trotter
INVENTOR

BY
ATTORNEY

Patented June 30, 1925.

1,544,285

UNITED STATES PATENT OFFICE.

HENRY R. TROTTER, OF SWARTHMORE, PENNSYLVANIA, ASSIGNOR TO WESTINGHOUSE ELECTRIC AND MANUFACTURING COMPANY, A CORPORATION OF PENNSYLVANIA.

BLEEDER TURBINE.

Application filed August 13, 1923. Serial No. 657,130.

*To all whom it may concern:*

Be it known that I, HENRY R. TROTTER, a citizen of the United States, and a resident of Swarthmore, in the county of Delaware and State of Pennsylvania, have invented a new and useful Improvement in Bleeder Turbines, of which the following is a specification.

My invention relates to bleeder turbines and it has for its object to provide apparatus of the character designated which shall operate with high efficiency when operated condensing.

A further object of my invention is to provide a bleeder turbine with a diaphragm structure for separating the high- and the low-pressure stages or sections with adequate port area so that steam may pass from the high-pressure section or stages to the low-pressure section or stages with a minimum of resistance.

A further object of my invention is to provide, in connection with a bleeder turbine, a diaphragm structure which shall include a stationary member having a series of ports and which carries a second member, rotatable with respect to the stationary member, for controlling the opening and closing of the ports, the second member having inner packing means for limiting leakage around the rotor.

A further object of my invention is to have the gland or dummy member of a bleeder turbine diaphragm constructed as a part of the valve means for controlling communication between the high- and the low-pressure sections of such a turbine.

Figure 2:
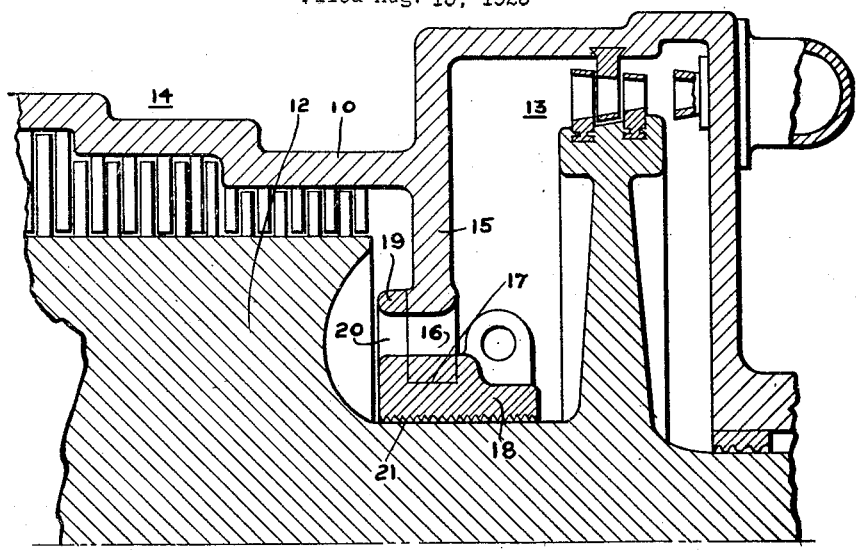
Figure 1:
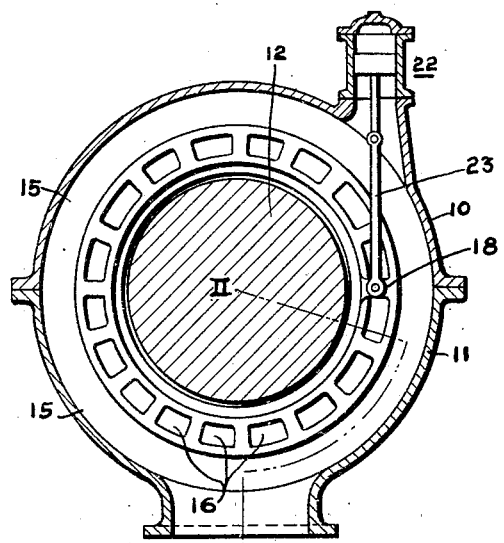
Figure 3:
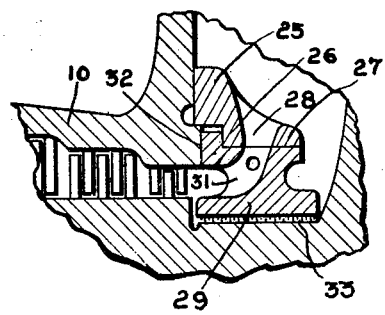

These and other objects are accomplished by apparatus made in accordance with my invention and illustrated in the accompanying drawings, forming a part of this application, in which Fig. 1 is a transverse sectional view of a turbine showing my improvement applied thereto; Fig. 2 is a fragmentary view taken along the line II—II of Fig. 1; and Fig. 3 is a fragmentary sectional view of a turbine showing a modified form of my improved diaphragm.

Bleeder turbines are ordinarily provided with diaphragms or overflow valves in order to permit of the traverse of steam from the high-pressure power-developing section to the low-pressure power-developing section. It is the object of my invention to provide an improved diaphragm structure which shall have adequate port area to afford communication between the turbine sections and which shall have the gland or dummy constituted as a part of the means for controlling the opening and closing of the diaphragm ports. Hence, in accordance with my construction, turbines of this character may be much simplified owing to the character of the design and to the absence of a multiplicity of parts.

Referring now to the drawings for a better understanding of my invention, in Figs. 1 and 2, I show a turbine casing consisting of upper and lower halves 10 and 11 which are secured together and surround a rotor 12. The turbine is provided with high-pressure blading, at 13, and with low-pressure blading, at 14, the high-pressure blading being separated from the low-pressure blading by means of my improved diaphragm structure including a gland or packing member and means for controlling communication between the high-pressure blading and the low-pressure blading.

In Figs. 1 and 2, I show a diaphragm structure consisting of inwardly-extending flange portions 15 carried by the upper and lower halves 10 and 11 of the casing and having a circumferential series of ports 16. The flanges 15 are provided with an interior bearing portion 17 which is spaced from the rotor and has fitted therein a dummy or gland member 18. The dummy or gland member 18 has an outwardly-extending flange 19 provided with a series of ports 20 adapted to register with the ports 16. Packing means 21 is carried by the gland or dummy member 18 and such packing means cooperates with the rotor 12 to limit leakage with respect to the latter. Movement of the inner member 18 in order to control communication between the ports 16 and 20 is secured by any suitable device, as, for example, by means of a motor device, at 22, which is connected to the member 18 by means of a link 23.

In Fig. 3, I show a modified form of my invention in which the turbine casing 10 has a ring member 25 secured thereto, and having an inwardly-extending portion 26 provided with an inner bearing portion 27 and with a series of ports 28. A dummy or gland member 29 is provided with a bearing portion which cooperates with the bearing portion 27 and it is provided with a series of ports 31 adapted to register with the ports 28. In order to secure a tight fit between the stationary ring member 25 and the dummy or gland member 29, the dummy member 29 is provided with a flange 32 which fits between the flange portion 26 and the casing 10. The movable member 29 is provided with packing 33 in order to limit leakage between the diaphragm structure and the turbine rotor 12.

From the structure described, it will be apparent that I have devised a bleeder turbine having a diaphragm structure which is provided with ample port area so that steam may pass from the high-pressure blading to the low-pressure blading with little resistance, whereby a bleeder turbine of the condensing type and operating at a high efficiency may be had. It will also be apparent that my improved construction is simple in design and involves but few parts. The structure is furthermore simplified by having the packing or gland portion also constructed as a part of the valve for controlling communication between the high-pressure and the low-pressure blading.

While I have shown my invention in but two forms, it will be obvious to those skilled in the art, that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a bleeder turbine, the combination of a casing, a rotor, high-pressure blading, low-pressure blading, and means carried by the casing for separating the high-pressure blading from the low-pressure blading, including a movable gland member fitting the rotor and having a valve means to control communication between the high- and the low-pressure blading.

2. In a bleeder turbine, the combination of a casing, a rotor, high-pressure blading, low-pressure blading, a stationary member carried by the casing between the high-pressure blading and the low-pressure blading and having a plurality of ports and an inner bearing portion, a member carried by the bearing portion and having a gland fitted with respect thereto to control communication between said ports.

3. In a bleeder turbine, the combination of a casing, a rotor, high-pressure blading, low-pressure blading, a stationary member carried by the casing between the high-pressure blading and the low-pressure blading and having a plurality of ports and an inner bearing portion, a movable member fitting the bearing portion, packing means carried by the movable member and cooperating with the rotor, and means carried by the movable member for opening and closing said ports upon movement of said movable member.

4. In a bleeder turbine, the combination of a casing, a rotor, high-pressure blading, low-pressure blading, an inwardly-extending flange arranged interiorly of the casing between the high-pressure blading and the low-pressure blading and having a circumferential series of ports and an inner bearing portion, a movable member fitting in the bearing portion and having a series of ports adapted to register with the first ports, and packing means carried by the movable member and cooperating with the rotor.

5. In a bleeder turbine, the combination of a casing, a rotor, high-pressure blading, low-pressure blading, an outer supporting member carried by the casing and having a series of ports and a bearing portion, an inner member fitting the bearing portion and having a series of ports adapted to register with the first ports, packing means carried by the inner member, and means to move the inner member to control communication between the ports.

6. In a bleeder turbine, the combination of a casing, a rotor, high-pressure blading, low-pressure blading, a member extending inwardly of the casing between the high-pressure blading and the low-pressure blading and having a circumferential series of ports and an inner bearing portion, an inner member having a bearing portion cooperating with the first portion and ports adapted to register with the first ports, packing means carried by the inner member and cooperating with the rotor, and means for moving the inner member so as to control communication between the ports.

7. In a bleeder turbine, the combination of a casing, consisting of upper and lower halves, a rotor, high-pressure blading, low-pressure blading, inwardly-extending flange portions carried by the casing and cooperating to define a diaphragm between the high-pressure blading and the low-pressure blading, said flange portions having a series of ports and an inner bearing portion, an inner movable member having a bearing portion fitting the first bearing portion and a series of ports adapted to register with the first ports, and packing means carried by said movable member and cooperating with the rotor.

In testimony whereof, I have hereunto subscribed my name this 2nd day of August, 1923.

HENRY R. TROTTER.